(12) United States Patent
Más Ivars et al.

(10) Patent No.: US 10,178,017 B2
(45) Date of Patent: Jan. 8, 2019

(54) METHOD AND CONTROL NODE FOR HANDLING DATA PACKETS

(71) Applicant: TELEFONAKTIEBOLAGET LM ERICSSON (PUBL), Stockholm (SE)

(72) Inventors: Ignacio Más Ivars, Tullinge (SE); Andras Vajda, Sundsberg (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/105,885

(22) PCT Filed: Dec. 18, 2013

(86) PCT No.: PCT/SE2013/005155
§ 371 (c)(1),
(2) Date: Jun. 17, 2016

(87) PCT Pub. No.: WO2015/094040
PCT Pub. Date: Jun. 25, 2015

(65) Prior Publication Data
US 2016/0344611 A1 Nov. 24, 2016

(51) Int. Cl.
*H04L 12/751* (2013.01)
*H04L 12/721* (2013.01)
(Continued)

(52) U.S. Cl.
CPC .............. *H04L 45/02* (2013.01); *H04L 45/38* (2013.01); *H04L 45/64* (2013.01); *H04L 69/22* (2013.01); *H04L 69/324* (2013.01)

(58) Field of Classification Search
CPC ......... H04L 45/02; H04L 45/38; H04L 45/64; H04L 69/22; H04L 69/324
See application file for complete search history.

(56) References Cited

U.S. PATENT DOCUMENTS 6,606,315 B1 * 8/2003 Albert .................... H04L 45/00
370/352
6,735,169 B1 * 5/2004 Albert .................... H04L 29/06
370/229

(Continued)

OTHER PUBLICATIONS

International Preliminary Report on Patentability issued in PCT/SE2013/051551, dated Jun. 21, 2016, 10 pages.

(Continued)

*Primary Examiner* — Kevin D Mew
(74) *Attorney, Agent, or Firm* — Rothwell, Figg, Ernst & Manbeck, p.c.

(57) ABSTRACT

A method and a control node (300) for establishing network functions for processing data packets of a data flow from a delivering node (306) to a receiving node (308) over a communication network (302). The control node identifies (3:2) flow characteristics relating to the data flow and determines (3:3) a succession of network functions (304) in the network for processing the data packets, based on the identified flow characteristics. The network functions (304) are then instructed (3:4a-c) to forward the data packets in the data flow according to the determined succession. The sequence of network functions specifies a service chain. The controller uses OpenFlow. Network functions are dynamically relocated based on network conditions.

21 Claims, 3 Drawing Sheets

(51) Int. Cl.
*H04L 12/715* (2013.01)
*H04L 29/06* (2006.01)
*H04L 29/08* (2006.01)

(56) References Cited

U.S. PATENT DOCUMENTS

| | | | | |
|---|---|---|---|---|
| 8,180,870 | B1* | 5/2012 | McDysan | H04L 41/0893 |
| | | | | 370/235 |
| 8,675,488 | B1* | 3/2014 | Sidebottom | H04L 67/141 |
| | | | | 370/229 |
| 8,743,690 | B1* | 6/2014 | Janarthanan | H04L 47/31 |
| | | | | 370/235 |
| 9,258,742 | B1* | 2/2016 | Pianigiani | H04L 67/327 |
| 9,894,188 | B2* | 2/2018 | Pettit | H04L 69/22 |
| 2003/0002438 | A1* | 1/2003 | Yazaki | H04L 29/06 |
| | | | | 370/229 |
| 2004/0047366 | A1* | 3/2004 | Chowdhury | H04L 29/06 |
| | | | | 370/466 |
| 2008/0137541 | A1* | 6/2008 | Agarwal | H04W 4/02 |
| | | | | 370/241 |
| 2011/0211583 | A1 | 9/2011 | Seetharaman et al. | |
| 2011/0261825 | A1* | 10/2011 | Ichino | H04L 45/38 |
| | | | | 370/400 |
| 2011/0286324 | A1* | 11/2011 | Bellagamba | H04L 41/0677 |
| | | | | 370/219 |
| 2012/0082163 | A1* | 4/2012 | Esteve Rothenberg | |
| | | | | H04L 45/00 |
| | | | | 370/392 |
| 2012/0099591 | A1* | 4/2012 | Kotha | H04L 45/54 |
| | | | | 370/392 |
| 2012/0190331 | A1* | 7/2012 | Ahmed | H04L 12/66 |
| | | | | 455/410 |
| 2013/0028091 | A1* | 1/2013 | Sun | G06F 9/5083 |
| | | | | 370/236 |
| 2013/0128746 | A1* | 5/2013 | Yedavalli | H04L 45/38 |
| | | | | 370/238 |
| 2013/0332983 | A1 | 12/2013 | Koorevaar et al. | |
| 2014/0010083 | A1* | 1/2014 | Hamdi | H04L 47/193 |
| | | | | 370/235 |
| 2014/0092906 | A1* | 4/2014 | Kandaswamy | H04L 69/22 |
| | | | | 370/392 |
| 2014/0233385 | A1* | 8/2014 | Beliveau | H04L 47/122 |
| | | | | 370/235 |
| 2014/0337507 | A1* | 11/2014 | Manghirmalani | H04L 43/0894 |
| | | | | 709/224 |
| 2014/0337508 | A1* | 11/2014 | Manghirmalani | H04L 41/04 |
| | | | | 709/224 |
| 2014/0337509 | A1* | 11/2014 | Manghirmalani | G06F 11/3006 |
| | | | | 709/224 |
| 2014/0344439 | A1* | 11/2014 | Kempf | G06F 9/5072 |
| | | | | 709/224 |
| 2015/0085678 | A1* | 3/2015 | Dimond | H04L 43/12 |
| | | | | 370/252 |
| 2015/0103838 | A1* | 4/2015 | Zhang | H04L 45/04 |
| | | | | 370/401 |
| 2015/0117202 | A1* | 4/2015 | Bhagavathiperumal | |
| | | | | H04L 47/10 |
| | | | | 370/235 |
| 2016/0099853 | A1* | 4/2016 | Nedeltchev | H04L 69/28 |
| | | | | 370/253 |

OTHER PUBLICATIONS

International Search Report issued in PCT/SE2013/051551, dated Apr. 24, 2014, 5 pages.

Qazi, Zafar et al., "SIMPLE-fying Middlebox Policy Enforcement Using SDN," SIGCOMM, ACM, XP058030639, dated Aug. 27, 2013, pp. 27-38.

Zhang et al., "StEERING: A Software-Defined Networking for Inline Service Chaining," IEE International Conference on Network Protocols (INCP), IEEE, XP032563772, dated Oct. 7, 2013, 10 pages.

* cited by examiner

METHOD AND CONTROL NODE FOR HANDLING DATA PACKETS

CROSS REFERENCE TO RELATED APPLICATION(S)

This application is a 35 U.S.C. § 371 National Phase Entry Application from PCT/SE2013/051551, filed Dec. 18, 2013, designating the United States, the disclosure of which is incorporated by reference.

TECHNICAL FIELD

The present disclosure relates generally to a method and a control node for establishing network functions operable to process data packets in a communication network.

BACKGROUND

Recently, the concept of a so-called Software Defined Network, SDN, has been developed which may be employed to handle data flows through a communication network in a customized manner, where a data flow refers to multiple consecutive data packets sent from a delivering node to a receiving node in a communication session e.g. according to the widely used Internet Protocol, IP. For example, the delivering node may be a content server delivering a media stream and the receiving node may be a consuming node where the received media stream may be played out or stored for later use. The data packets are typically transported over various network nodes, such as routers and switches, which make up an end-to-end transport path through the communication network from the delivering node to the receiving node. Mechanisms and techniques for routing the packets of a data flow from one network node to another, also referred to as forwarding, are well-known in the art which is not necessary to describe here in any detail as such.

In this field, the term "router" is commonly used for a network node that routes data packets according to the so-called IP layer, or layer 3, while the term "switch" is commonly used for a node that forwards data packets according to the so-called link layer, or layer 2. In general, route and forward both basically refer to the operation of identifying a next node for a received data packet and sending the packet thereto. For simplicity, the term forward will be used in this disclosure to represent both forward and route regardless of layer or protocol used.

In this context, so-called service chaining may be employed for handling a particular data flow, which refers to establishing a succession of network functions which are operable to process data packets in the data flow at various points through the communication network. This succession, or "chain", of network functions has thus been adapted to handle this particular data flow in some desired and/or required manner. The network functions may be implemented as physical appliances at certain network nodes, or as virtual appliances, e.g. by creating a virtual machine or the like for each network function by means of suitable software, which functions operate to process data packets in the data flow at specific network nodes in the communication network. These network functions can thus be seen as a customized network path that may be programmed for this particular data flow in a more or less dynamic manner.

However, in order to decide which network functions are needed for a particular data flow, it is necessary to analyze the data packets therein and possibly also to know the current status of the communication network in terms of traffic load and/or available resources. One way that has been proposed to achieve the above service chaining for a data flow, is to employ a central control function, commonly denoted SDN controller, which analyzes the data packets and configures the network nodes, more or less in real-time, to forward the data packets accordingly towards the necessary network functions in the network. Such a service chaining control function may be implemented as a software plug-in at the SDN controller.

This approach is illustrated in FIG. 1 where a delivering node 100 such as a content server or the like sends data packets to a consumer node 102, thus forming a data flow over a routing path of schematically shown network nodes "N" representing various switches and routers in a communication network 104. An SDN controller 106 analyzes the data packets in the flow and configures a plurality of network functions "NF" at corresponding network nodes N which then operate to process and forward the data packets as required by the SDN controller 106 in real-time, i.e. on a per packet basis.

However, this real-time analysis of packets and central control of the network nodes N is somewhat inefficient. Further, the switches and routers in the network nodes N need to be capable of being programmed by a central controlling entity such as the SDN controller 106, which requires more advanced, thus more expensive, equipment than the simple switches and routers commonly used today. It may thus be required that such hardware functionality is added to virtually all the switches and routers in a network of today to implement the above solution. Such an upgrade of functionality can be quite costly to make, particularly in a communication network where the number of switches and routers is large.

Another possible way that could be more efficient would be to implement some intelligence in the network functions themselves, to make them capable of chaining the needed network functions which in this case would perform this analysis and take decisions about how the data packets of a particular data flow should be processed and forwarded to the next network function. This approach would however be rather costly as well since such intelligence is needed in a great number of network functions requiring large investments in hardware and/or software. It is thus a problem to achieve efficient customized service chaining which is adapted for a particular data flow at reasonable costs and without considerable complexity in the network.

SUMMARY

It is an object of embodiments described herein to address at least some of the problems and issues outlined above. It is possible to achieve this object and others by using a method and a control node as defined in the attached independent claims.

According to one aspect, a method is performed by a control node for establishing network functions operable to process data packets in a communication network. In this method, the control node identifies flow characteristics relating to a flow of data packets sent from a delivering node to a receiving node over the communication network. In an illustrative but non-limiting example, the delivering node may be a content server delivering a stream of content data such as a movie, and the receiving node may be a communication device of an end-user receiving the stream of content data.

The control node further determines a succession of network functions in the communication network for processing the data packets in the detected flow, based on the identified flow characteristics, and instructs the network functions to forward the data packets in the flow according to the determined succession. Determining the succession of network functions may be further based on current circumstances in the communication network such as traffic load and malfunction of any equipment in the network, to mention a few non-limiting examples.

According to another aspect, a control node is arranged to establish network functions operable to process data packets in a communication network. The control node is configured to perform the above-described method and may comprise an identifying module which is configured to identify flow characteristics relating to a flow of data packets sent from a delivering node to a receiving node over the communication network. The control node may further comprise a logic module which is configured to determine a succession of network functions in the communication network for processing the data packets in the detected flow, based on the identified flow characteristics, and an instructing module which is configured to instruct the network functions to forward the data packets in the flow according to the determined succession.

The above method and control node may be configured and implemented according to different optional embodiments to accomplish further features and benefits, to be described below.

According to further aspects, a computer program comprises computer readable code which, when run on the above control node, causes the control node to perform the method described herein, and a computer program product comprises a computer readable medium on which the above computer program is stored.

BRIEF DESCRIPTION OF DRAWINGS

The solution will now be described in more detail by means of exemplary embodiments and with reference to the accompanying drawings, in which.

DETAILED DESCRIPTION

Figure 1:
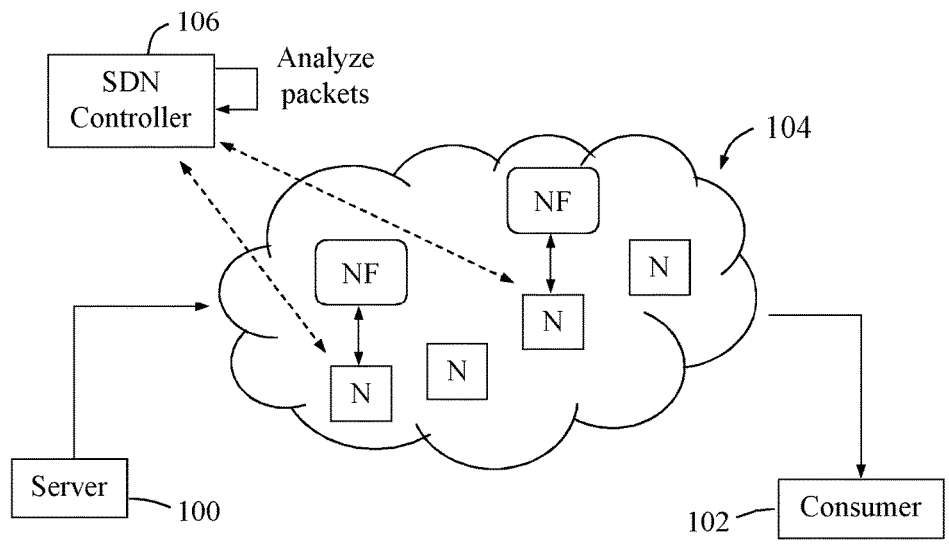
FIG. 1 is a communication scenario illustrating how network functions can be implemented for a data flow, according to the prior art.

Briefly described, a solution is provided to enable efficient and flexible usage of network functions for a data flow in a communication network, without resulting in excessive costs and high complexity in the network. This may be achieved by various embodiments described herein which may be implemented by functionality in a central control node which is arranged to establish network functions operable to process data packets in a communication network.

In this solution, the control node determines a succession of network functions needed for processing data packets in a data flow, and instructs the network functions themselves to forward the data packets according to the determined succession throughout the data flow. This way, the "intelligence" for determining the needed succession of network functions can be entirely implemented in the central control node while the network functions need only be capable of acting according to instruction received initially from the control node, which provides for efficient handling and transport of the packets in the data flow without requiring intelligence in the network functions. In addition, no costly modification or upgrading of hardware is required whatsoever in the switches and routers. These advantages and others will be understood from the following description of various possible embodiments for how the solution may be employed in practice.

An example of a procedure with actions, performed by a control node, to establish network functions operable to process data packets in a communication network, will now be described with reference to the flow chart in FIG. 2. This procedure thus illustrates how the control node can act when defining and controlling a succession of network functions for a data flow such that the benefits of improved efficiency and low costs may be achieved. The control node is thus arranged or configured to perform the actions of the flow chart in FIG. 2. It is assumed that a data packet in this context comprises a header part basically with information needed to handle and process the packet during transmission, and a payload part basically with data that is to be received and used in one way or another at the final receiving node, such as a consumer node.

A first action 200 illustrates that the control node may first detect a flow of data packets sent from a delivering node to a receiving node over the communication network. This action may be performed according to the following example, although the procedure is not limited to this example. The data flow may be detected when a first data packet of the flow, sent from the delivering node, is received in a network node, e.g. a router or switch, which data packet is not recognized as belonging to any already established data flow, e.g. based on information in a header of the received packet such as source address and/or destination address and/or other header data that can identify the flow. When such a network node recognizes that the data packet belongs to a new non-established data flow, i.e. the packet cannot be mapped to any existing flow, the network node forwards the data packet to the control node for analysis.

In a next action 202, the control node identifies flow characteristics relating to the detected flow of data packets from the delivering node to the receiving node. The flow characteristics may be identified from the header information and/or from the payload content of the packet. For example, so-called Deep Packet Inspection (DPI) or other analysis operation may be used in this action for identifying the flow characteristics. In some possible but non-limiting embodiments, the flow characteristics may pertain to at least one of:

Payload content in the data packets, which may indicate a type of content, a format of the payload content, the amount of data to be communicated, and so forth.

An identity of the delivering node, which is normally indicated by a source address or the like included in the header information.

An identity of the receiving node, which is likewise normally indicated by a destination address or the like included in the header information.

A service profile applying to the receiving node, which may be indicated explicitly in the header information or it may be obtained based on the identity of the receiving node. The service profile may be defined for the delivering node and/or its user and may refer to an expected quality level and/or service class at the receiving node.

A service profile applying to the delivering node, e.g. likewise indicated in the header information or obtained based on the identity of the delivering node.

A further action 204 illustrates that the control node determines a succession of network functions in the communication network for processing the data packets in the detected flow, based on the identified flow characteristics. In some further possible but non-limiting embodiments, the control node may select the network functions in the succession of network functions to accomplish at least one of:

Transcoding of media from one format to another format, e.g. in order to accomplish format conversion, data compression or data upsampling, to mention a few examples.

Parental control, e.g. if the data flow contains a movie or the like.

Caching of data, e.g. if the data can be expected to be transported more than once.

Modification of a header in the data packets, e.g. to become suitable for changing to another transport protocol than may be required in the network.

Modification of payload content in the data packets, e.g. if anything should be removed from or added to the content.

Modification of data packet size, e.g. to become suitable for another transport protocol.

Virus detection, e.g. if the delivering node cannot be fully trusted with respect to data viruses or the like.

In another possible embodiment, the control node may in action 204 determine the succession of network functions further based on current circumstances in the communication network. These network circumstances may refer to a current traffic load on the network or on certain parts thereof, malfunction of equipment or software, a current load distribution over network nodes, and so forth. The current circumstances in the communication network may further refer to a current time of day or week and also to a geographical location of the respective network functions.

A further action 206 illustrates that the control node instructs the selected network functions in the determined succession of network functions to forward the data packets in the flow according to the determined succession. For example in general terms, the determined succession of network functions may comprise at least a first network function, a second network function and a third network function where the data packets in the flow are to be processed in the first, second and third network functions in that specific order, e.g. according to any of the examples given above. In that case, the control node in action 206 instructs the first network function to forward all data packets of this data flow to the second network function, and also instructs the second network function to forward all data packets of this data flow to the third network function, and so forth.

Some further possible embodiments of the procedure in FIG. 2 will be suggested below. For example, the network functions may be configured with a forwarding table that maps different data flows to a next hop such as to a next network function. In a possible embodiment, instructing the network functions may in that case comprise populating a next hop forwarding table at the respective network functions according to the determined succession of network functions. Thereby, the network functions only need to map each incoming packet in the flow to a particular flow entry in the forwarding table to decide the next hop to the next network function, which is a fairly simple operation. In this context, the forwarding table may alternatively be called a routing table depending on the terminology used. In another possible embodiment, the control node may instruct the network functions over an interface between the control node and the respective network functions using a protocol called OpenFlow.

Figure 5:
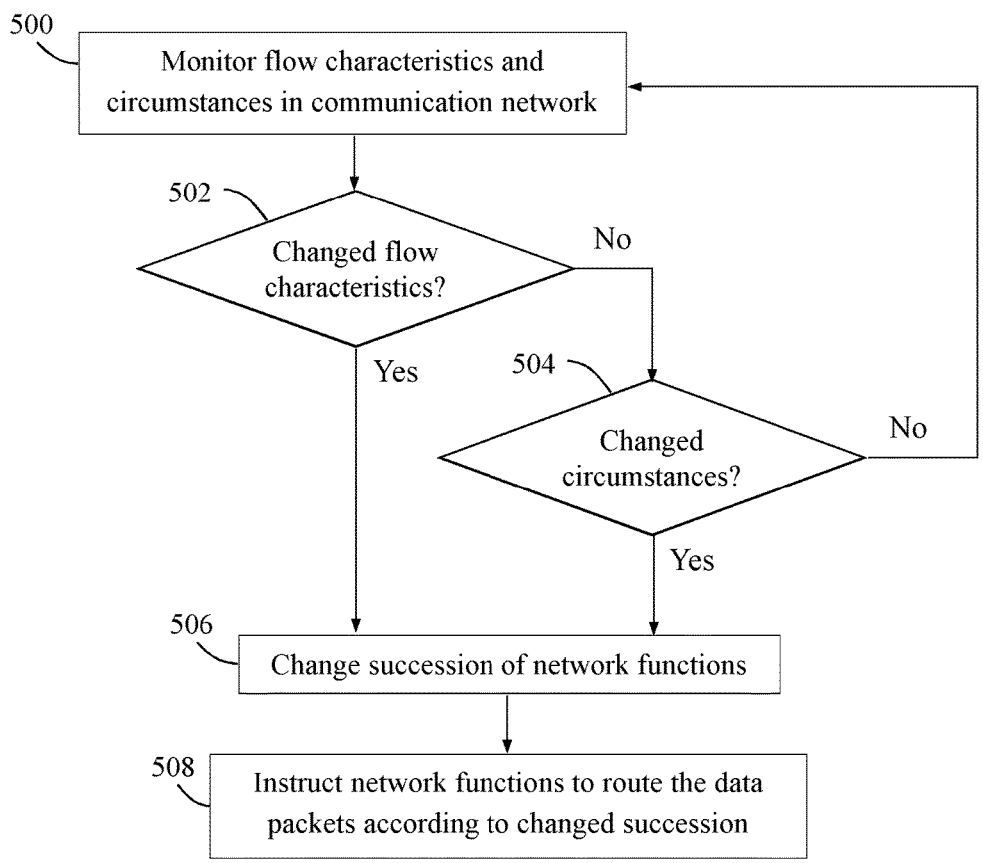
FIG. 5 is another flow chart illustrating a procedure that may be performed by a control node when the procedure of FIG. 2 has been performed, according to further possible embodiments.

It was mentioned above that it is an advantage that the control node only needs to instruct the selected network functions initially, i.e. once it has determined the data flow characteristics, e.g. based on the first packet of the data flow. The network functions in the succession are the able to forward all packets in the flow accordingly. However, the ongoing data flow may nevertheless be monitored by the control node in case any flow characteristics and/or circumstances in the network should change during the session of the data flow, which might warrant a different succession of network functions to be more suitable than the initially determined one. In another possible embodiment, the control node may therefore change the succession of network functions when the flow characteristics and/or current circumstances of the communication network have changed, which will be described in more detail later below with reference to FIG. 5.

In yet another possible embodiment, the control node may select the succession of network functions from a set of preconfigured successions of network functions. For example, the control node may be configured with such a set of preconfigured successions of network functions where each succession is associated with a certain combination of flow characteristics, e.g. including one or more of the above-described examples of flow characteristics. Thereby, the action 204 of determining a succession of network functions for the data flow could be facilitated and performed with greater speed.

A practical example of how the above-described procedure may be implemented will now be described with reference to the communication scenario in FIG. 3 which illustrates an example of how a control node 300 might perform the procedure of FIG. 2 for a data flow in a communication network 302. The control node 300 is thus associated with the communication network 302 which comprises a plurality of network nodes "N" such as routers and switches or similar. The figure also illustrates schematically some examples of network functions 304 where network function A is implemented in a node N1, network function B is implemented in a node N2 and network function C is implemented in a node N3, and so forth.

In this scenario, a delivering node 306 being connected to network 302 starts to send data packets in a data flow which packets are addressed to a receiving node 308 which may likewise be connected to the network 302. However, nodes 306 and 308 may be connected to different access networks as well, not shown, and network 302 should generally be seen as a transport network between the two communicating nodes 306 and 308 where the described solution can be implemented.

A first action 3:1 illustrates that the control node 300 detects the data flow, e.g. as described above for action 200. In action 3:2 the control node 300 analyzes a packet in the data flow and identifies its flow characteristics, e.g. as described above for action 202. In action 3:3 the control node 300 further determines a succession of network functions A, B, C, . . . , based on the identified flow characteristics, e.g. as described above for action 204, which network functions are suitable for processing the data packets in that order.

The control node 300 then instructs the network functions A, B, C . . . to forward the data packets in the flow according to the determined succession, e.g. as described above for action 206. Thus, in an action 3:4*a* the control node 300 instructs network function A to forward the packets to the next network function B, in an action 3:4*b* the control node 300 instructs network function B to forward the packets to the next network function C, in an action 3:4*c* the control node 300 instructs network function C to forward the packets to the next network function, and so forth. Thereby, the network functions A, B, C . . . are configured to forward the data packets according to the determined succession such that the packets will be processed in that order to suite the particular characteristics of the flow. As a result, network function A receives and forwards any data packet of the data flow to the next network function B in an action 3:5*a*, network function B receives and forwards any data packet of the data flow to the next network function C in an action 3:5*b*, network function C receives and forwards any data packet of the data flow to the next network function in an action 3:5*c*, and so forth. As shown in the figure, the transport path of the data flow, indicated by arrows within network 302, may comprise any number of other network nodes in between the network nodes N1, N2, N3 . . . that have the corresponding network functions A, B, C . . . implemented.

Figure 2:
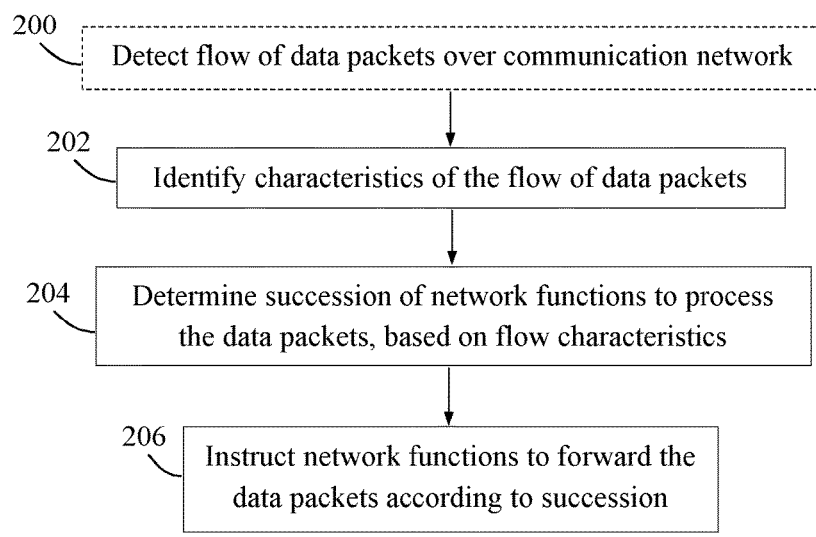
FIG. 2 is a flow chart illustrating a procedure in a control node, according to further possible embodiments.
Figure 3:
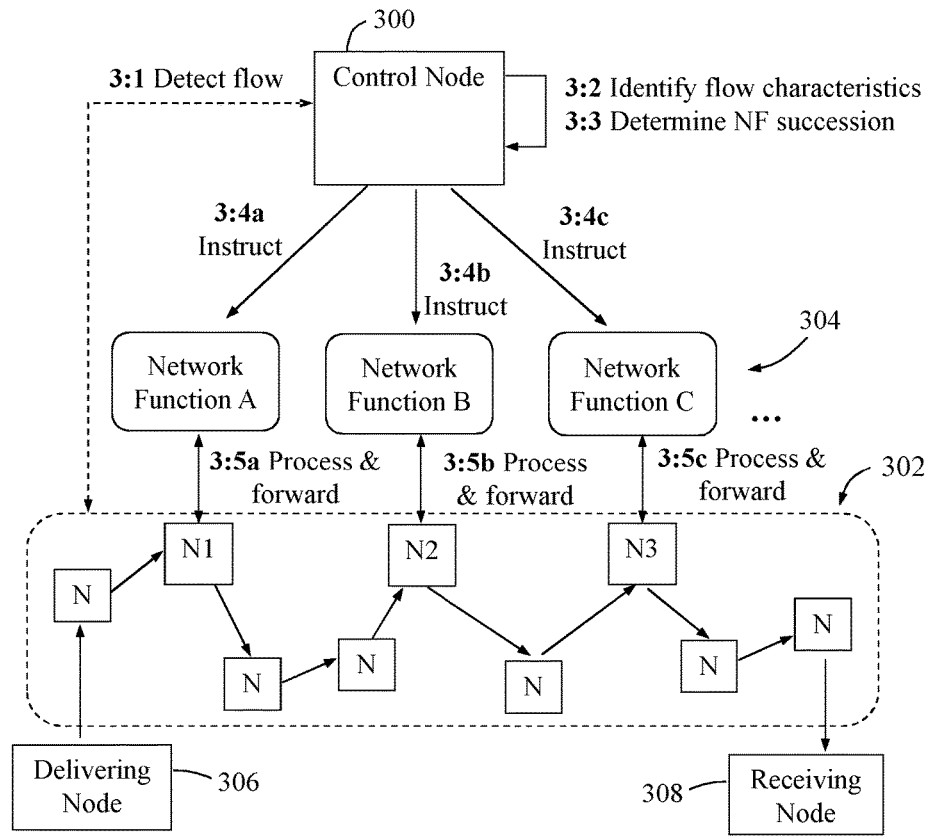
FIG. 3 is a signaling scenario illustrating an example when the solution is used for a data flow through a path of network nodes in a communication network, according to further possible embodiments.
Figure 4:
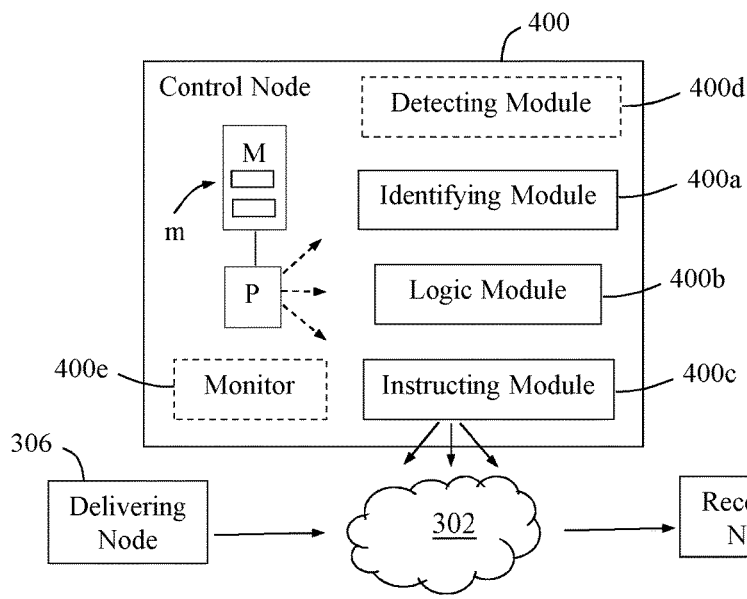
FIG. 4 is a block diagram illustrating a control node in more detail, according to further possible embodiments.

A detailed but non-limiting example of how a control node may be structured with some possible functional entities such as modules, circuits or units, to bring about the above-described functionality of the control node, is illustrated by the block diagram in FIG. 4 where some numerals from FIG. 3 are reused. In this figure, the control node 400 is arranged to establish network functions operable to process data packets in a communication network 302. The control node 400 may be configured to operate according to any of the examples and embodiments of employing the solution as described above and as follows. In particular, the control node 400 may be arranged or configured to perform at least the actions of the flow chart in FIG. 2 in the manner described above.

More specifically, the control node 400 is configured to identify flow characteristics relating to a flow of data packets sent from a delivering node to a receiving node over the communication network. The control node 400 is also configured to determine a succession of network functions in the communication network for processing the data packets in the detected flow, based on the identified flow characteristics, and to instruct the network functions to forward the data packets in the flow according to the determined succession.

To accomplish this, the control node 400 may be implemented with different functional modules or the like as shown in FIG. 4. The control node 400 comprises an identifying module 400*a* which is configured to identify flow characteristics relating to a flow of data packets sent from a delivering node 306 to a receiving node 308 over the communication network 302, as in the above actions 202 and 3:2. The control node 400 also comprises a logic module 400*b* which is configured to determine a succession of network functions 304 in the communication network for processing the data packets in the detected flow, based on the identified flow characteristics, as in the above actions 204 and 3:3. The control node 400 also comprises an instructing module 400*c* which is configured to instruct the network functions 304 to forward the data packets in the flow according to the determined succession, as in the above actions 206 and 3:4*a-c*.

The above control node 400 and its functional modules and units may be configured or arranged to operate according to various optional embodiments such as those described above in connection with FIGS. 2 and 4. In a possible embodiment, the control node 400 may also comprise a detecting module 400*d* which is configured to detect the data flow, e.g. as in the above actions 200 and 3:1. Alternatively, such a detecting module may be implemented outside and accessible to the control node 400. The detecting module 400*d* may be implemented as a DPI engine or the like. In another possible embodiment, the control node 400 may further comprise a monitoring function 400*e* which is configured to monitor the flow characteristics and circumstances in the communication network, to be further described below in connection with FIG. 5.

It should be noted that FIG. 4 illustrates some possible functional units in the control node 400 and the skilled person is able to implement these functional units in practice using suitable software and hardware. Thus, the solution is generally not limited to the shown structures of the control node 400, and the functional modules 400*a-e* may be configured to operate according to any of the features described in this disclosure, where appropriate.

The embodiments and features described herein may be implemented in a computer program comprising computer readable code which, when run on a control node, causes the control node to perform the above actions e.g. as described for FIGS. 2 and 3. Further, the above-described embodiments may be implemented in a computer program product comprising a computer readable medium on which the above computer program is stored. The computer program product may be a compact disc or other carrier suitable for holding the computer program. Some examples of how the computer program and computer program product can be realized in practice are outlined below.

The functional modules 400*a-e* described above for FIG. 4 may be implemented in the control node 400 by means of program modules of a respective computer program comprising code means which, when run by a processor "P" causes the control node 400 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the control node 400 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the control node 400.

It was mentioned above that the control node may change the succession of network functions when the flow characteristics and/or current circumstances of the communication network have changed such that another succession would be more suitable than the one initially used. This possibility will now be described in more detail with reference to the flow chart in FIG. 5 which illustrates how the control node 300, 400 may operate basically after the procedure of FIG. 2 has been performed. In a first action 500, the control node 300, 400 monitors the flow characteristics and circumstances in the communication network.

In a further action 502, the control node firstly checks whether the previously identified flow characteristics have changed in a manner that would warrant or motivate a different succession of network functions that would be more suitable for the data flow than the one currently applied. For example, one or more specific parameters of the flow characteristics may be monitored and checked if they have changed so that they satisfy some predefined criteria. In another action 504, the control node secondly checks whether the current circumstances of the communication network have changed in a manner that would warrant or motivate a different succession of network functions. Some parameter(s) related to the network circumstances may be monitored and evaluated with respect to some criteria here as well for deciding whether a different succession of network functions is warranted or not.

If the outcome is "yes" in either or both of the actions 502 and 504, the control node 300, 400 changes the succession of network functions for the data flow in a following action 506. In this action, the control node 300, 400 may basically repeat the operation of determining the succession of network functions based on the new flow characteristics if changed and/or based on the current circumstances in the communication network if changed. In some possible embodiments, the control node 300, 400 may change the succession of network functions by performing at least one of the following three operations:

Adding one or more new network functions to the determined succession of network functions 304 which may be needed to further process the data flow.

Removing one or more network functions from the determined succession of network functions 304 which may not be needed anymore to process the data flow.

Changing placement of one or more network functions in the determined succession of network functions 304. For example, instead of routing the packets to network functions A, B and C in that order, it may be decided that they should better be routed according to the order of B, C and A.

After action 506, the control node 300, 400 instructs the network functions in the changed succession to forward the data packets in the flow according to the changed succession of network functions, e.g. as described above for action 206, in a further action 508. If, on the other hand, the outcome is "no" in both of the actions 502 and 504, the control node 300, 400 may simply return to action 500 and continues to monitor the flow characteristics and circumstances in the communication network.

Some potential advantages of the solution and its possible embodiments described above include better efficiency and flexibility for controlling the transport path and order of processing the data packets in the data flow, as well as limited costs for implementing the solution since the network nodes need not be upgraded with more advanced hardware and no intelligence is needed the network functions for analyzing flow characteristics and for determining the next hop in a succession of network functions for packets in a data flow. Other potential advantages are that the processing of a data flow is easily scalable and that the underlying transport infrastructure can be totally transparent, i.e. unaffected. The load on the network functions can also be easily balanced, or distributed evenly, e.g. by taking the current traffic load and/or equipment load into consideration when determining the succession of network functions.

While the solution has been described with reference to specific exemplifying embodiments, the description is generally only intended to illustrate the inventive concept and should not be taken as limiting the scope of the solution. For example, the terms "control node", "network function", "network node", "data flow", "flow characteristics" and "next hop" have been used throughout this disclosure, although any other corresponding entities, functions, and/or parameters could also be used having the features and characteristics described here. The solution is defined by the appended claims.

The invention claimed is:

1. A method for establishing network functions operable to process data packets in a communication network, the method comprising:
   a control node receiving a first data packet forwarded to the control node by a network node as a result of the network node determining that the first data packet does not belong to any already established data flow;
   the control node identifying, based on the received first data packet, flow characteristics relating to the data flow to which the first data packet belongs,
   the control node determining, based on the identified flow characteristics, at least a first network function and a second network function in the communication network for processing the data packets belonging to the data flow to which the first data packet belongs,
   the control node instructing the first network function to process data packets belonging to the data flow and, after processing, forward the processed data packets to the second network function, and
   the control node instructing the second network function to process data packets belonging to the data flow and, after processing, forward the processed data packets.

2. The method of claim 1, wherein the flow characteristics pertain to at least one of: payload content in the data packets, identity of the delivering node, identity of the receiving node, service profile applying to the receiving node, and service profile applying to the delivering node.

3. The method of claim 1, wherein the control node determines at least the first network function and the second network function to accomplish at least one of: transcoding of media from one format to another format, parental control, caching of data, modification of a header in the data packets, modification of payload content in the data packets, modification of data packet size, and virus detection.

4. The method of claim 1, wherein instructing the network functions comprises populating a next hop forwarding table at the determined network functions.

5. The method of claim 1, wherein the control node determines at least the first network function and the second network function further based on current circumstances in the communication network.

6. The method of claim 1, wherein the control node instructs the determined network functions over an OpenFlow interface.

7. The method of claim 1, wherein the control node further determines network functions in the communication network for processing the data packets when the flow characteristics and/or current circumstances of the communication network have changed.

8. The method of claim 7, wherein the control node further determines network functions in the communication network for processing the data packets by performing a process comprising at least one of: determining one or more new network functions, removing at least one or more of the first network function and the second network function, and changing placement of the first network function with the second network function.

9. The method of claim 1, wherein the control node determines the first network function and the second network function based on a set of preconfigured successions of network functions.

10. A control node arranged to establish network functions operable to process data packets in a communication network, the control node comprising:
 a memory; and
 a processor coupled to the memory, wherein the processor is configured to:
 receive a first data packet forwarded to the control node by a network node as a result of the network node determining that the first data packet does not belong to any established data flow;
 identify, based on the received first data packet, flow characteristics relating to the data flow to which the first data packet belongs;
 determine, based on the identified flow characteristics, at least a first network function and a second network function in the communication network for processing the data packets belonging to the data flow to which the first data packet belongs;
 instruct the first network function to process data packets belonging to the data flow and, after processing, forward the processed data packet to the second network function; and
 instruct the second network function to process data packets belonging to the data flow and, after processing, forward the processed data packets.

11. The control node of claim 10, wherein the flow characteristics pertain to at least one of: payload content in the data packets, identity of the delivering node, identity of the receiving node, service profile applying to the receiving node, and service profile applying to the delivering node.

12. The control node of claim 10, wherein the processor is further configured to determine at least the first network function and the second network function to accomplish at least one of: transcoding of media from one format to another format, parental control, caching of data, modification of a header in the data packets, modification of payload content in the data packets, modification of data packet size, and virus detection.

13. The control node of claim 10, wherein the processor is further configured to instruct the network functions by populating a next hop forwarding table at the determined network functions.

14. The control node of claim 10, wherein the processor is further configured to determine at least the first network function and the second network function further based on current circumstances in the communication network.

15. The control node of claim 10, wherein the processor is further configured to instruct the determined network functions over an OpenFlow interface.

16. The control node of claim 10, wherein the processor is further configured to determine network functions in the communication network for processing the data packets when the flow characteristics and/or current circumstances of the communication network have changed.

17. The control node of claim 16, wherein the processor is further configured to determine network functions in the communication network for processing the data packets by performing a process comprising at least one of: determining one or more new network functions, removing at least one or more of the first network function and the second network function, and changing placement of the first network function with the second network function.

18. A computer program product comprising a non-transitory computer readable medium on which a computer program is stored, wherein the computer program comprises computer readable code which, when run on a control node, causes the control node to:
 receive a first data packet forwarded to the control node by a network node as a result of the network node determining that the first data packet does not belong to any already established data flow;
 identify, based on the received first data packet, flow characteristics relating to the data flow to which the first data packet belongs;
 determine, based on the identified flow characteristics, at least a first network function and a second network function in the communication network for processing the data packets belonging to the data flow to which the first data packet belongs;
 instruct the first network function to process data packets belonging to the data flow and, after processing, forward the processed data packet to the second network function; and
 instruct the second network function to process data packets belonging to the data flow and, after processing, forward the processed data packets.

19. The method of claim 1, further comprising:
 the control node determining, based on the identified flow characteristics, a third network function in the communication network for processing the data packets belonging to the data flow to which the first data packet belongs,
 the control node instructing the second network function, after processing, to forward the processed data packets to the third network function, and
 the control node instructing the third network function to process data packets belonging to the data flow and, after processing, forward the processed data packets.

20. The method of claim 1, wherein the first data packet is forwarded to the control node by the network node as a result of the network node determining that the first data packet belongs to a data flow that is not already established.

21. The method of claim 1, further comprising:
 the network node receiving the first data packet;
 the network node determining whether the first data packet belongs to any already established data flow; and
 the network node forwarding the first data packet to the control node as a result of determining that the first data packet does not belong to any already established data flow.

* * * * *